(12) United States Patent
Pekkala

(10) Patent No.: US 11,098,925 B1
(45) Date of Patent: Aug. 24, 2021

(54) END SEALS FOR PARABOLIC TROUGH SOLAR COLLECTORS AND A PARABOLIC TROUGH SOLAR COLLECTOR

(71) Applicant: ABSOLICON SOLAR COLLECTOR AB, Härnösand (SE)

(72) Inventor: Christer Pekkala, Ornskoldsvik (SE)

(73) Assignee: ABSOLICON SOLAR COLLECTOR AB, Härnösand (SE)

( * ) Notice: Subject to any disclaimer, the term of this patent is extended or adjusted under 35 U.S.C. 154(b) by 0 days.

(21) Appl. No.: 17/266,033

(22) PCT Filed: Aug. 13, 2019

(86) PCT No.: PCT/SE2019/050742
§ 371 (c)(1),
(2) Date: Feb. 4, 2021

(87) PCT Pub. No.: WO2020/036528
PCT Pub. Date: Feb. 20, 2020

(30) Foreign Application Priority Data

Aug. 13, 2018 (SE) .................................... 1850972-9

(51) Int. Cl.
*F24S 80/70* (2018.01)
*F24S 23/74* (2018.01)

(52) U.S. Cl.
CPC .............. *F24S 80/70* (2018.05); *F24S 23/74* (2018.05)

(58) Field of Classification Search
CPC ............. F24S 80/70; F24S 23/74; F24S 10/70
See application file for complete search history.

(56) References Cited

U.S. PATENT DOCUMENTS

| 4,038,971 A | 8/1977 | Bezborodko |
| 4,106,484 A | 8/1978 | Dame |
| (Continued) | | |

FOREIGN PATENT DOCUMENTS

| DE | 19904646 A1 | 8/2000 |
| DE | 202005010363 U1 | 9/2005 |
| (Continued) | | |

OTHER PUBLICATIONS

International Preliminary Report on Patentability dated Jun. 22, 2020 in related/corresponding PCT Application No. PCT/SE2019/050742.

(Continued)

*Primary Examiner* — David J Laux
*Assistant Examiner* — Nikhil P Mashruwala
(74) *Attorney, Agent, or Firm* — Patent Portfolio Builders PLLC

(57) ABSTRACT

An end seal arrangement for a Parabolic Trough solar Collector, PTC, comprises an elongated parabolic reflector trough and a receiver pipe arranged at a focus-line of the reflector trough. The end seal arrangement comprises a housing configured to be fixated to one short-end of the reflector trough, and an inlay configured to be inserted in the housing to slidably abut a circumference of the receiver pipe, such that the reflector trough is sealed to the receiver pipe by the inlay when the housing is fixated to the short-end of the reflector trough and the reflector trough pivots about its focus-line. The end seal arrangement further comprises a fixation means configured to fixate the housing to the reflector trough. By reducing heat leakage and prevent ice, snow, sand, etc. from deteriorating the reflector, improved operational performance will be achieved.

6 Claims, 5 Drawing Sheets

(56) References Cited

U.S. PATENT DOCUMENTS

| | | | |
|---|---|---|---|
| 4,202,322 A | 5/1980 | Delgado et al. | |
| 4,205,659 A | 6/1980 | Beam | |
| 4,216,764 A | 8/1980 | Clark | |
| 4,220,136 A * | 9/1980 | Penney | F24S 20/25 |
| | | | 126/600 |
| 2010/0236600 A1 * | 9/2010 | Kimura | F24S 30/425 |
| | | | 136/246 |
| 2011/0168161 A1 * | 7/2011 | Capan | F24S 30/425 |
| | | | 126/578 |
| 2016/0169560 A1 * | 6/2016 | Leberer | F24S 50/40 |
| | | | 126/714 |
| 2017/0108244 A1 * | 4/2017 | Matsudo | F24S 70/225 |

FOREIGN PATENT DOCUMENTS

| | | |
|---|---|---|
| EP | 2372265 A1 | 10/2011 |
| EP | 2338009 B1 | 8/2017 |
| WO | 2017111354 A1 | 6/2017 |

OTHER PUBLICATIONS

International Search Report / Written Opinion dated Nov. 7, 2019 in related/corresponding PCT Application No. PCT/SE2019/050742.
Indian Examination Report in corresponding/related Indian Application No. 202117005811 dated Jun. 10, 2021.

* cited by examiner

Fig. 1 (Existing art)

END SEALS FOR PARABOLIC TROUGH SOLAR COLLECTORS AND A PARABOLIC TROUGH SOLAR COLLECTOR

TECHNICAL FIELD

This disclosure relates to energy supply, especially to construction solutions in systems for solar energy production.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which significantly negatively affects our environment. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar panels, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focus-line of the reflector. The receiver is commonly a black tube filled with a transport fluid, such as water, glycol, or oil. The tube is heated by the concentrated solar radiation and the heat is transferred to the transport fluid that is circulated in a system where the heated transport fluid could be used. The heated transport fluid may be used both as process heat in industrial processes as for district heating.

The term "PTC" (Parabolic Trough solar Collector) will be used in this disclosure to denote a concentrating solar collector with a trough-formed reflector arranged to concentrate solar light onto a fluid tube. Typically, PTCs will be pivoted to track the sun during the day and are controlled by a solar tracking arrangement.

A parabolic trough solar collector comprises an elongated reflector, which reflective surface in a cross-section describes a parabolic curve. The reflector focuses direct sunlight on a focus. In mathematical terms, such parabola has the properties "curve", "focus", "*Latus* rectum", and "optical axis of symmetry". The parabolic through's "optical plane of symmetry" is defined by extending the parabolas axis of symmetry along the longitudinal direction of the trough.

With reference to FIG. 1, which is a schematic view, an existing PTC will now be described according to one example.

The PTC 100 comprises an elongated reflector 102, e.g. parabolic shaped, and a receiver pipe 104. The reflector 102 reflects incoming direct solar radiation onto the receiver pipe as concentrated solar radiation. The receiver pipe 104 is connected to a system where heat absorbed by the receiver pipe 104 is transferred by a transport liquid that circulates in the system to be utilised. In FIG. 1 there are also some receiver holders 108 shown that holds the receiver pipe 104 at the focus-line of the reflector 102.

An example of a Parabolic Trough solar Collector is disclosed in the European patent EP 2 338 009, B1.

It is a challenge to achieve improved operational performance in parabolic trough solar collectors.

SUMMARY

It would be desirable to improve operational performance in thermal solar energy systems. It is an object of this disclosure to address at least one of the issues outlined above.

Further there is an object to provide a mechanism that improves heat output of parabolic trough solar collectors and reduces needs for service and maintenance. These objects may be met by an arrangement according to the attached independent claims.

According to a first aspect, an end seal arrangement is provided for a PTC (Parabolic Trough solar Collector), where the PTC comprises an elongated parabolic reflector trough and a receiver pipe arranged at a focus-line of the reflector trough. The end seal arrangement comprises a housing configured to be fixated to one short-end of the reflector trough, and an inlay configured to be inserted in the housing to slidably abut a circumference of the receiver pipe, such that the reflector trough is sealed to the receiver pipe by the inlay when the housing is fixated to the short-end of the reflector trough and the reflector trough pivots about its focus-line. The end seal arrangement further comprises a fixation means configured to fixate the housing to the reflector trough.

Furthermore, the inlay may comprise a material which configures the inlay to support the receiver pipe such that the inlay keeps the receiver pipe at the focus-line of the reflector trough when the inlay is inserted in the housing, and the end seal arrangement is fixated at the reflector trough. The inlay may comprise a profile of carbon fibre covered with a sleeve comprising graphite.

According to a second aspect a PTC is provided the comprises an elongated parabolic reflector trough, adapted to concentrate direct solar radiation onto a focus-line of the reflector trough, and a receiver pipe arranged at the focus-line of the reflector trough and configured to transport a transport fluid. The PTC further comprises two end seal arrangements according to the first aspect, arranged at respective short-ends of the reflector trough.

By providing PTCs with end seal arrangements that reliably seals gaps between the receiver pipes and the short-ends of the elongated parabolic reflector troughs, heat leakages may be effectively reduced, especially for closed PTCs. In addition, the end seal arrangements may protect the reflector as well and the receiver pipe from environmental factors as ice, snow, dust, sand, etc. Reduced heat leakage contributes to increased heat production and protection against environmental factors contributes to prolonged life cycle and reduced needs for service and maintenance. Each of these effects may achieve improved operational performance.

BRIEF DESCRIPTION OF DRAWINGS

The solution will now be described in more detail by means of exemplifying embodiments and with reference to the accompanying drawings, in which.

DETAILED DESCRIPTION

Figure 1:
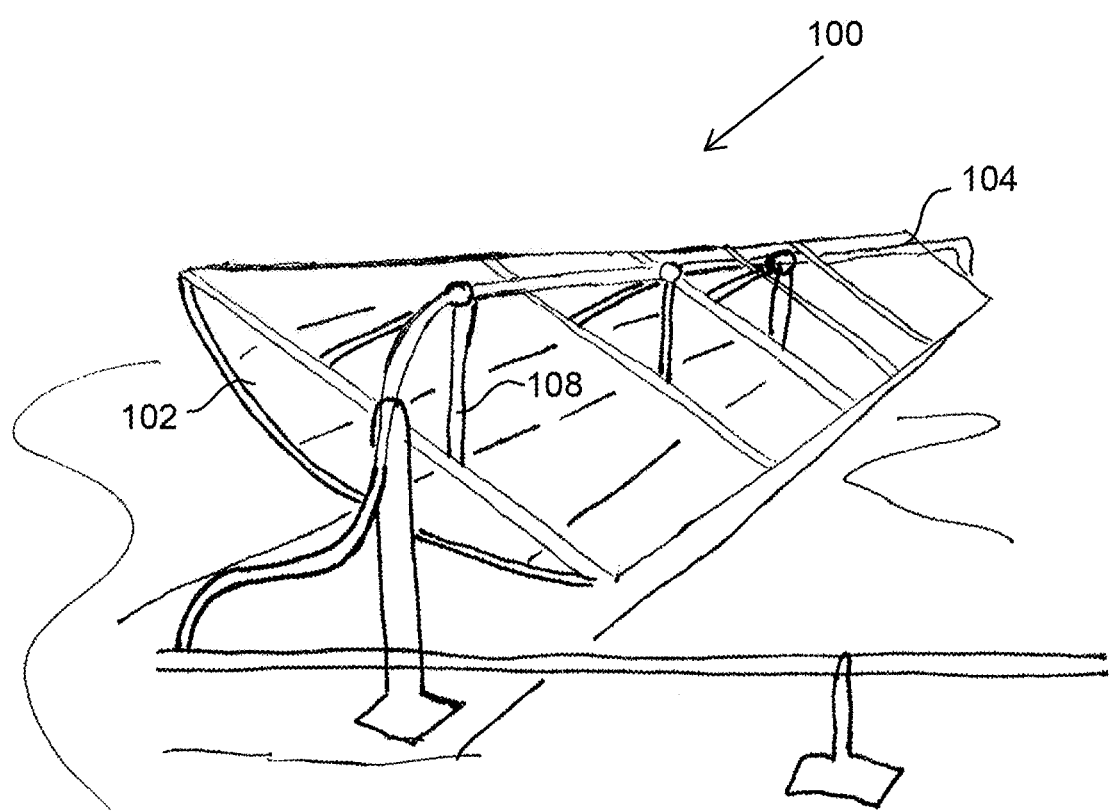
FIG. 1 is a schematic environmental illustration of a parabolic trough solar collector in accordance with existing art.
Figure 2:
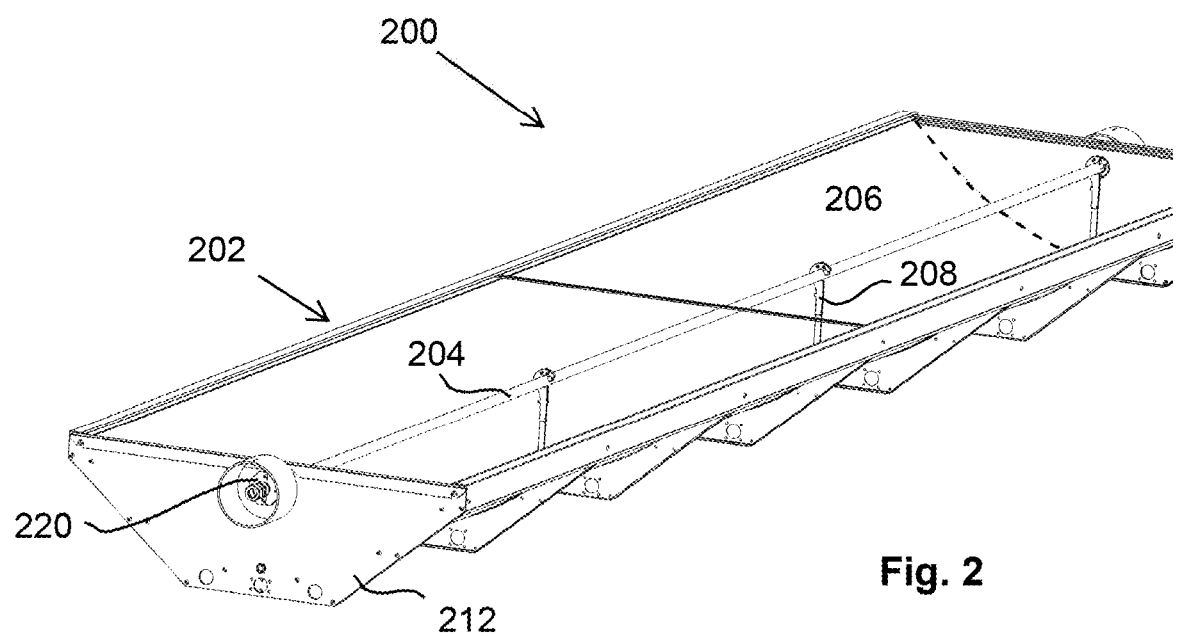
FIG. 2 is a schematic illustration of an arrangement in a solar collector, according to possible embodiments.

With reference to FIG. 2, which is a schematic perspective view, a PTC (Parabolic Trough solar Collector) 200 will now be described in accordance with one exemplifying embodiment.

The PTC 200 comprises an elongated parabolic reflector trough 202, and a receiver pipe 204. The reflector trough 202 comprises an elongated parabolic reflector 206 with a cross-sectional curvature according to a parabolic function and two short-ends 212 through which the receiver pipe 204 protrudes. In this embodiment the parabolic function is $y=x^2$. The receiver pipe 204 is held at the parabolic reflector's 206 focus-line by appropriately arranged receiver holders 208. In this embodiment four receiver holders 208 (one is hidden in FIG. 2) are arranged, two close to the respective short-ends 212 of the reflector trough 202 and two therebetween. Furthermore, the PTC 200 has one end seal arrangement 220 arranged at each of its short-ends 212, i.e. at the reflector trough's 202 short-ends 212.

The end seal arrangements 220 will be further described below in conjunction with other embodiments.

Figure 3A:
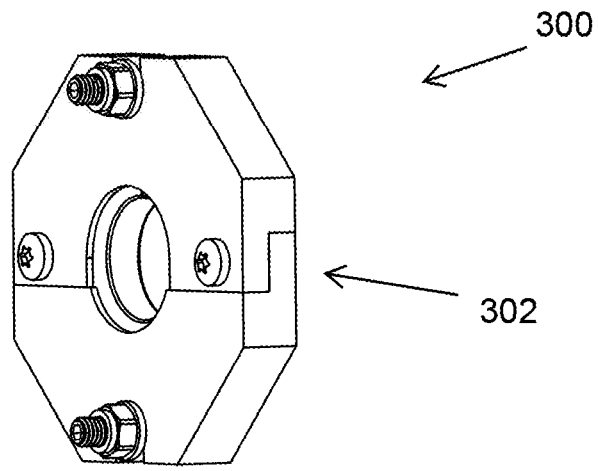
FIGS. 3a-d are schematic illustrations of end seals for solar collectors, according to possible embodiments.

As illustrated in FIG. 3a, the end seal arrangement 300 comprises a housing 302 which is configured to be fixated to the short-end of the reflector trough, i.e. at one of its gables.

Figure 3B:
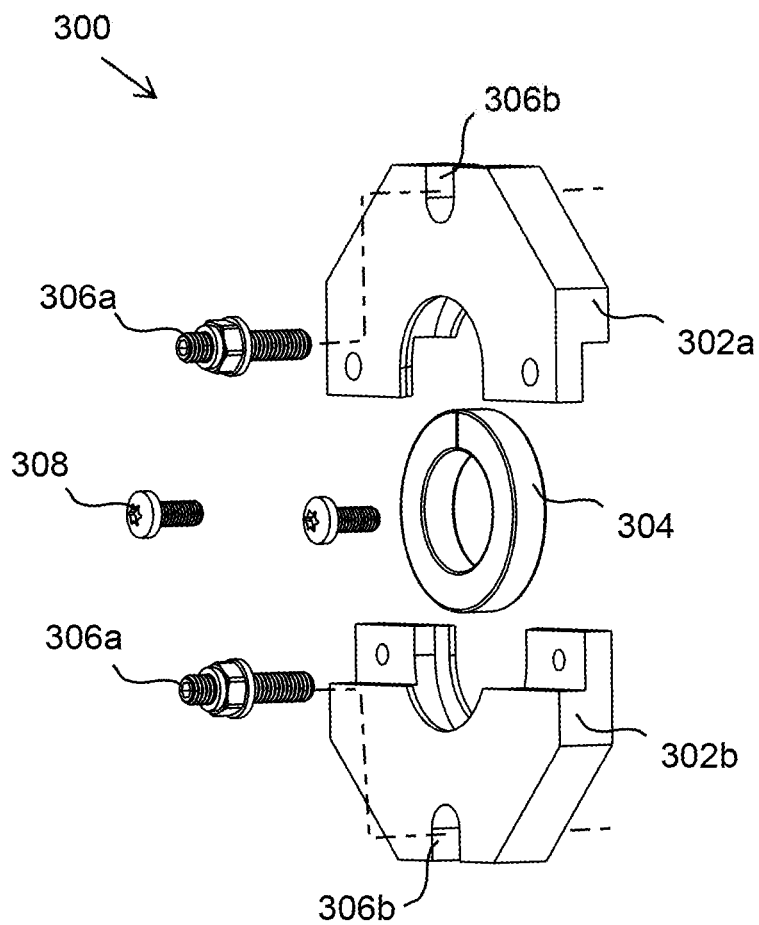

As illustrated in FIG. 3b, which is a schematic exploded view, the housing 302 comprises two halves 302a, 302b, which are intended to be put together when mounting the end seal arrangement 300 at the PTC. Designing the end seal arrangement 300 with its housing 302 divided in two halves 302a, 302b facilitate mounting by enabling the housing halves 302a, 302b to be put together around the receiver pipe's circumference. This is an advantage, especially when the receiver pipe extends out of the reflector trough's short-ends. The end seal arrangement 300 further comprises fixation means 306a, 306b adapted to fixate the housing halves 302a, 302b to the reflector trough's short-ends. In this embodiment the fixation means are implemented as a pair of bolts 306a that fits into a pair of corresponding threaded holes provided in the reflector trough's short-end. Each of the housing halves 302a, 302b has a recess or hole 306b through which the bolts 306a are inserted before reaching the short-ends. When fixating the housing halves 302a, 302b to the short-ends, heads of the bolts 306a presses around the recesses or holes 306b. However, the inventive concept is not limited to fixate the end seal arrangement 300 by bolts/holes. Alternative fixation means of the end-seal arrangement 300 may be applied when appropriate, e.g. it may be fixated by glue, heat, tape, welding, etc.

An inlay 304 is further comprised in the end-seal arrangement 300 to be inserted in a cavity or pocket of the housing 302, the pocket formed by the housing halves 302/302b. The inlay 304 is adapted to slidably abut the receiver pipe when inserted, to seal the reflector trough to the receiver pipe and preventing dust and moisture from entering through the gap between receiver pipe and reflector trough. Thereby, the receiver pipe and the reflector trough will be reliably sealed also when the reflector trough is pivoting about the receiver pipe. Typically, for closed PTCs where the reflector troughs' apertures are covered, e.g. with glass, there is a benefit to be able to reliably seal the receiver pipes and the reflector troughs to each other in order to prevent heat leakage and thereby improve heat output, but also for limiting deterioration of the PTCs caused by various environmental factors, such as ice, snow and sand.

By selecting materials with appropriate material characteristics when designing the inlay 304, the inlay 304 may give the end seal arrangement 300 some beneficial capacities. For instance, a relative stiff material in the inlay 304 will achieve a capacity of supporting the receiver pipe, such that the end seal may act as receiver holder too. One appropriate material for the inlay 304 is carbon fibre, which may be provided as an elongated core to be bent when inserted into the cavity of the housing 302 to encircle the receiver pipe's circumference. Thereby, traditional receiver holders located near the ends of the reflector trough may be replaced by the end seal arrangements 300, which reduces the number of components of the PTCs, makes them cheaper and less complex, and reduces costs for manufacturing and service.

Another suitable material characteristics to strive for is heat resistance. A heat resistant material of the inlay 304 may insulate the receiver pipe which in service turns hot, typically about 160° C. Thereby heat loss from the receiver pipe could be further reduced due to decreased conductivity.

In one exemplifying embodiment which is related to some above described ones, the inlay 304 has a square formed cross-sectional profile of carbon fibre enclosed in a sleeve comprising graphite. I.e. the carbon fibre cross-section ensures that the receiver pipe will be reliably supported but indeed is soft enough to seal the interface between the receiver pipe and the reflector trough's short-end.

However, the inventive concept is not limited to this combination of material and cross-sectional profile. It is to be noted that these parameters may be variated when appropriate, e.g. the cross-sectional profile may be circular, oval, etc. and the material of the profile may be any suitable PEEK (PolyEtherEtherKetone) plastics or the like. The above described sleeve provides the characteristics of making the surface of the inlay 304 soft and lubricating due to the graphite content.

By designing the inlay 304 as a profile to be formed and inserted in a cavity of the housing 302, 302a/302b, mounting of the end seal arrangement 300 may be facilitated. When providing the housing in two halves 302a/302b to be put together the halves may be designed with mounting means 308, e.g. screws and screw-holes trough which the housing halves 302a, 302b will be screwed together, as seen in the FIGS. 3a and 3b.

In an alternative exemplifying embodiment, which is based on some above described ones, any or both of the housing halves 302a, 302b may be equipped with means for facilitating correct positioning of the end seal arrangement 300. For instance, the housing halves 302a, 302b may be designed with specific protrusions that fit in holes of the PCTs short-ends. Such protrusions may be formed as semi-circles that together forms a circle when the housing halves 302a, 302b are put together around the receiver pipe 204, wherein the circle fits into the receiver pipe's through hole. By designing the housing halves 302a, 302b with one or further protrusions, precision in positioning the end seal arrangements could be improved which is advantageous when the end seal arrangements will replace traditional receiver holder at the PTC's ends.

The inventive concept of this disclosure may also be alternatively implemented without deviating from its scope. With reference to the FIGS. 3c and 3d, respectively, which are schematic exploded views, two alternative implementations will now be described with reference to exemplifying embodiments.

Figure 3C:
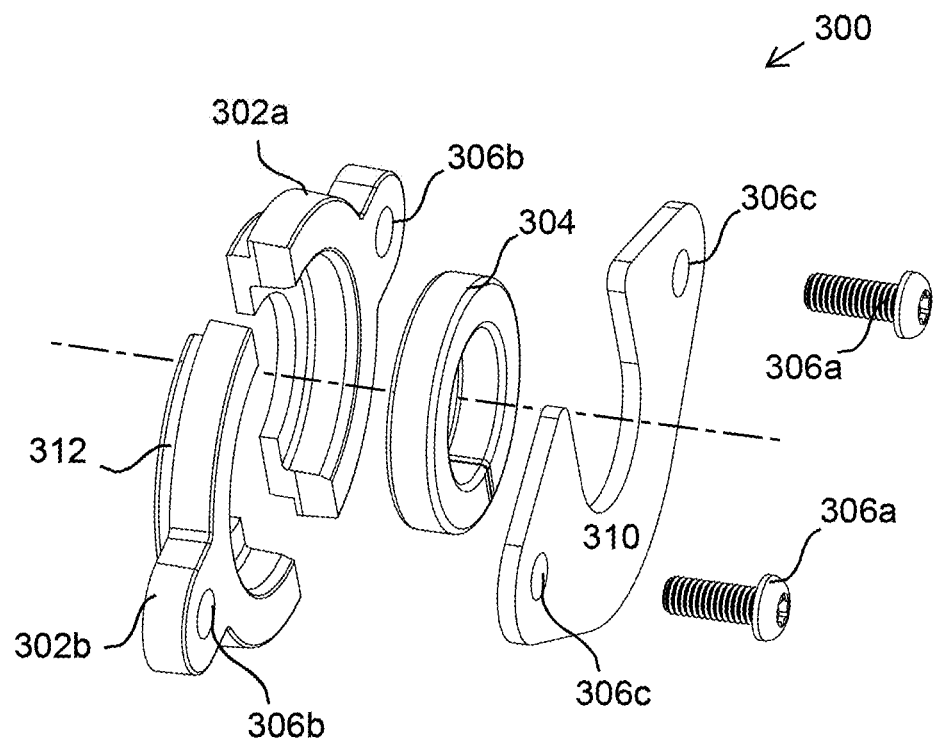

In FIG. 3c, an end seal arrangement 300 comprises a housing formed of two housing halves 302a, 302b and a lid 310. Inside the housing a cavity is established when the housing halves 302a, 302b are put together and the lid 310 is placed thereon. Inside this cavity an inlay 304 is inserted. The inlay 304 corresponds with inlays already described above in conjunction with other exemplifying embodiments and will therefore not be further described here. The end seal arrangement 300 further comprises fixation means in form of two screws 306a, and corresponding holes 306b, 306c provided in the housing halves 302a, 302b, and the lid 310, respectively. When the screws 306a are inserted in the holes 306b, 306c and are screwed into threaded holes of the PTC's short end (not shown), they will fixate the end seal arrangement 300 to the short end of the PTC.

As illustrated in FIG. 3c, the housing halves 302a, 302b may in addition be equipped with protrusions 312 that fits into the receiver pipe's through hole in the PTC's short end to improve precision in positioning the end seal arrangement 300 at the PTC. In addition, a recess may be provided in the lid 300 to facilitate mounting, i.e. the recess enables the lid to be pushed from one side onto the housing halves 302a, 302b. Thereby the lid 310 advantageously may be positioned also when the receiver pipe (not shown) is already arranged in the reflector trough of the PTC.

Figure 3D:
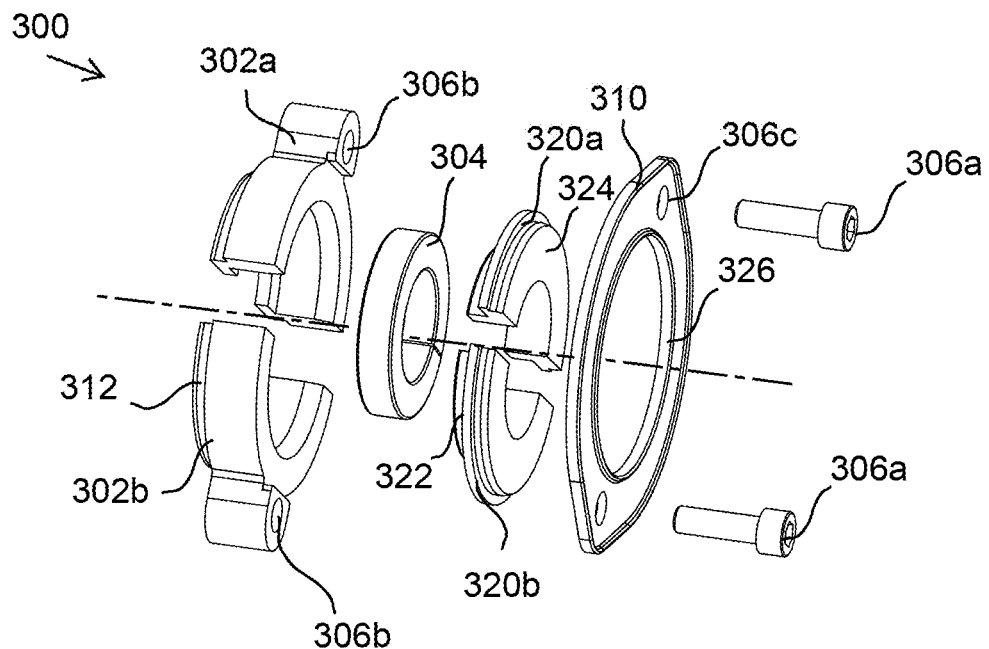

A similar design is schematically illustrated in FIG. 3d, and the same reference numbers will be used when appropriate. Also in this embodiment an end seal arrangement 300 comprises a housing formed of two housing halves 302a, 302b and a lid 310, and an inlay 304 will be inserted into a cavity of the housing. In addition, the end seal arrangement 300 of this embodiment further comprises two mounting parts 320a, 320b designed to close the cavity and ensure that the inlay 304 will be reliably located in the cavity. As seen in FIG. 3d, the mounting parts 320a, 320b comprises first protrusions 322 to fit in the cavity when being mounted. As understood, by providing the mounting parts 320a, 320b as separate pieces mounting is facilitated when the receiver pipe is already mounted and connected. However, the mounting parts 320a, 320b may be designed in one single piece to without deviating from the protective scope.

The lid 310 of this embodiment differs by comprising a circular inner contact surface 326 for contacting second protrusions 324 of the mounting parts 320a, 320b. Thereby precision in positioning the mounting parts 320a, 320b may be improved. It is to be noted that even if the lid 310 is illustrated as a ring-formed structure to be thread over the second protrusions 324, the lid 310 is not limited thereto. Also in this embodiment the lid 310 may comprise a recess to facilitate mounting at PTCs which receiver pipes are already mounted or connected.

Figure 4:
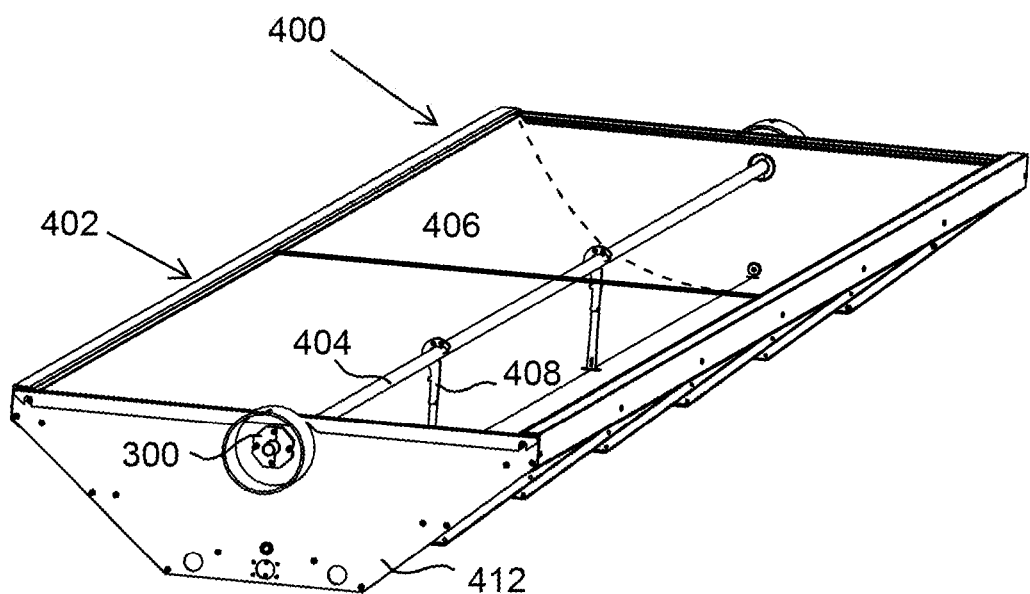
FIG. 4 is a schematic illustration of an arrangement for solar collectors, according to possible embodiments.

With reference to FIG. 4, which is a schematic perspective view, a PTC 400 will now be described in accordance with one exemplifying embodiment. The PTC 400 comprises an elongated parabolic reflector trough 402, and a receiver pipe 404 corresponding to the elongated parabolic reflector trough 202 and receiver pipe 204 illustrated in FIG. 2. The reflector trough 402 comprises an elongated parabolic reflector 406 with a cross-sectional curvature according to a parabolic function and two short-ends 412 through which the receiver pipe 404 protrudes. In this embodiment the parabolic function is $y=x^2$. The receiver pipe 404 is held at the parabolic reflector's 406 focus-line by appropriately arranged receiver holders 408. The PTC 400 has one end seal arrangement 300 arranged at each of its short-ends 412, i.e. at the reflector trough's 402 short-ends 412. The end seal arrangements 300 has already been described above in conjunction with other embodiments and is therefore referred to with the same reference number. As indicated in FIG. 4, the PTC 400 lacks receiver holders 408 near its short-ends 412 and their supporting functionality is instead achieved by the end seal arrangements 300.

The PTC 400 corresponds to the PTC 200 in FIG. 2, and this disclosure will focus on the differences therebetween.

One difference between the PTCs of these embodiments is that the PTC 400 has end seal arrangements 300 arranged at its short ends 412, i.e. at its gables. The end seal arrangements 300 has already been disclosed in conjunction with other embodiments and with reference to the FIGS. 3a-3d.

However, it is to be noted that the end seal arrangements 300 are not limited to provide support to the receiver pipe 404. Alternatively, the end seal arrangement may be directed to only seal the gap between the receiver pipe 404 and the short-end 412. In such an alternative embodiment, the inlay may be manufactured of any appropriate heat resistant resilient material, e.g. comprising rubber, or plastics.

Both the PTCs 200 and 400 may be covered with a glass at their aperture to protect their reflectors, receiver tubes and further components from environmental factors as snow, ice, dust, sand, etc., but also to limit heat loss therefrom. In both of the FIGS. 2 and 4 a seam between two glass sections is indicated.

Figure 5:
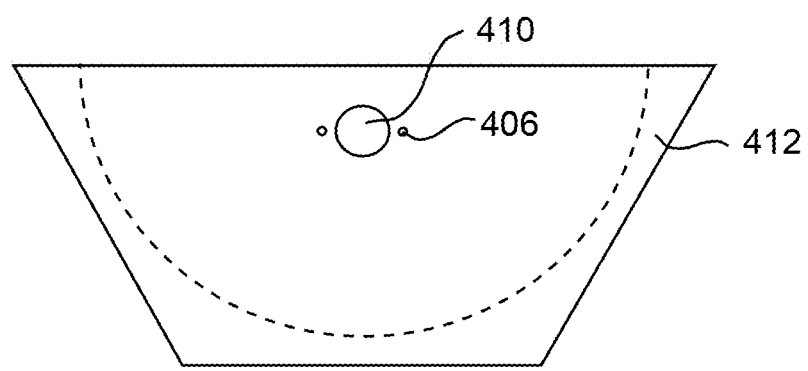
FIG. 5 is a schematic illustration of a short-end for solar collectors, according to possible embodiments.

With reference to FIG. 5, which is a schematic view, a short-end 412 of a reflector trough will now be described in accordance with one exemplifying embodiment. A short-end has already been illustrated and mentioned above in conjunction with some embodiments and the same reference numbers will therefore be applied when appropriate.

The short-end 412 is configured to be attached to an elongated parabolic reflector as gable of an elongated parabolic reflector trough. Such a reflector trough comprises two gables located at respective short-ends of the elongated reflector.

The short-end 412 is provided with a through hole 410 for the receiver pipe and two threaded holes 406 configured to receive fixating means, such as screws or bolts for fixating end seal arrangements.

Reference throughout the specification to "one embodiment" or "an embodiment" is used to mean that a particular feature, structure or characteristic described in connection with an embodiment is included in at least one embodiment.

Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. An end seal arrangement for a Parabolic Trough solar Collector, PTC, the PTC comprising an elongated parabolic reflector trough and a receiver pipe arranged at a focus-line of the reflector trough, the end seal arrangement comprising:
   a housing configured to be fixated to one short-end of the reflector trough,
   an inlay configured to be inserted in the housing to slidably abut a circumference of the receiver pipe, such that the reflector trough is sealed to the receiver pipe by the inlay when the housing is fixated to the short-end of the reflector trough and the reflector trough pivots about its focus-line, and
   a fixation means configured to fixate the housing to the reflector trough wherein the housing comprises two housing halves configured to be put together around the receiver pipe's circumference.

2. The end seal arrangement according to claim 1, wherein the inlay comprises a material which configures the inlay to support the receiver pipe such that the inlay keeps the receiver pipe at the focus-line of the reflector trough when the inlay is inserted in the housing, and the end seal arrangement is fixated at the reflector trough.

3. The end seal arrangement according to claim 1, wherein the inlay comprises a profile of carbon fibre covered with a sleeve comprising graphite.

4. The end seal arrangement according to claim 3, wherein the inlay has an elongated form and is configured to be bent about the receiver pipe's circumference when being inserted in the housing.

5. The end seal arrangement according to claim 1, wherein the housing further comprises a lid configured to together with the housing halves form a cavity for the inlay.

6. A Parabolic Trough solar Collector, PTC, comprising:
   an elongated parabolic reflector trough, adapted to concentrate direct solar radiation onto a focus-line of the reflector trough,
   a receiver pipe arranged at the focus-line of the reflector trough and configured to transport a transport fluid, and
   two end seal arrangements according to claim 1, arranged at respective short-ends of the reflector trough.

* * * * *